(12) United States Patent
Bhattacharjee et al.

(10) Patent No.: US 7,631,014 B2
(45) Date of Patent: Dec. 8, 2009

(54) METHOD AND APPARATUS FOR FAST DELETION OF PHYSICALLY CLUSTERED DATA

(75) Inventors: Bishwaranjan Bhattacharjee, Yorktown Heights, NY (US); Leslie A. Buback, Toronto (CA); Timothy Ray Malkemus, Round Rock, TX (US); Michael J. Winer, Markham (CA)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 11/412,554

(22) Filed: Apr. 27, 2006

(65) Prior Publication Data

US 2007/0255772 A1 Nov. 1, 2007

(51) Int. Cl.
G06F 7/00 (2006.01)
G06F 17/00 (2006.01)
(52) U.S. Cl. .................... 707/104.1; 707/101; 707/102
(58) Field of Classification Search .............. 707/7, 707/101, 8, 3, 100, 102, 200, 103 R, 206; 375/233

See application file for complete search history.

(56) References Cited

U.S. PATENT DOCUMENTS

| | | | |
|---|---|---|---|
| 6,195,659 B1 * | 2/2001 | Hyatt ............................ | 707/7 |
| 6,546,395 B1 * | 4/2003 | DeKimpe et al. ............ | 707/101 |
| 7,236,974 B2 * | 6/2007 | Bhattacharjee et al. ......... | 707/8 |
| 7,328,206 B2 * | 2/2008 | Petculescu et al. ............. | 707/3 |
| 2003/0195898 A1 * | 10/2003 | Agarwal et al. ......... | 707/103 R |
| 2004/0205066 A1 * | 10/2004 | Bhattacharjee et al. ......... | 707/8 |
| 2004/0220972 A1 * | 11/2004 | Bhattacharjee et al. ...... | 707/200 |
| 2006/0020619 A1 * | 1/2006 | Netz et al. .................. | 707/102 |
| 2006/0206496 A1 * | 9/2006 | Aureglia et al. ............. | 707/100 |

FOREIGN PATENT DOCUMENTS

WO WO 2004092978 A2 * 10/2004

OTHER PUBLICATIONS

"Multi-Dimensional Clustering: A New Data Layout Scheme in DB2"; Padmanabhan, Bhattacharjee; Cranston, Huras; Jun. 9-12, 2003 ACM; CA.*
Randell et al., "Visual Studio 2005: Bridge the Gap Between Development and Operations with Whitehorse", msdn magazine, pp. 1-9, retrieved Apr. 19, 2006 http://msdn.microsoft.com/msdnmag/issues/04/07/Whitehorse.
Williams, "An Overview of Microsoft's Whitehorse", Mar. 23, 2004, retrieved Apr. 19, 2006 http://www.developer.com/net/cplus/print.php/3329641.

(Continued)

Primary Examiner—John E Breene
Assistant Examiner—Giovanna Colan
(74) Attorney, Agent, or Firm—Yee & Associates, P.C.; Preston J. Young

(57) ABSTRACT

A computer implemented method, apparatus, and computer usable program code for deleting rows in a multidimensional clustering database. A multidimensional clustering processor receives a request to delete a set of multidimensionally clustered data. The multidimensional clustering processor determines whether all multidimensionally clustered data is located in a block. Responsive to all multidimensionally clustered data qualifying for deletion, the multidimensional clustering processor deletes all data in the block to delete the set of multidimensionally clustered data.

13 Claims, 6 Drawing Sheets

OTHER PUBLICATIONS

"Rational Application Developer for WebSphere Software—Comprehensive Eclipse-based rapid application development for software developers", IBM, pp. 1-2, retrieved Apr. 19, 2006 http://www.ibm.com/software/awktools/developer/application.

Eclipse website, retrieved Apr. 19, 2006 http://www.eclipse.com.

Beck "D44 Table Partitioning Fundamentals", IBM Corporation 2005, DB2 Information Management Technical Conference, Orlando Florida, Sep. 2005, pp. 1-43.

* cited by examiner

METHOD AND APPARATUS FOR FAST DELETION OF PHYSICALLY CLUSTERED DATA

BACKGROUND OF THE INVENTION

1. Field of the Invention

The present invention relates generally to managing data and resources in a database. More specifically, the present invention relates to a computer implemented method and computer usable program code for rapidly deleting rows of a database while logging details concerning deletion of the rows.

2. Description of the Related Art

The largest hierarchical structure of a database is the table. When a user creates a table, the table is empty. Later, a user may add one or more rows to a table. A row is at least one value. A database management system arranges values in fields. A field is an open storage space that is large enough to accommodate expected data. Often a field is limited to a particular type, such as a date, or a negative numeric value, or an alphanumeric string, among other types of data or information. The database management system organizes fields within different rows. The database management system organizes each field that represents the same type of data for a set of rows into a column of that same type of data.

Periodically, users may remove large amounts of data from a database, usually by deleting multiple rows of data from the database. Reasons for deleting large amounts of data from databases vary. For example, users delete data to eliminate obsolete data. Sometimes users delete data in response to receiving new data when the free space or storage in a database is exhausted. This strategy usually is preferred to the strategy of adding more disk storage to accommodate new data.

Another occasion to delete data from a database occurs when an enterprise stops doing business in a certain area. For example, a database may include rows with a tract of data related to Region A. The enterprise may stop doing business in Region A. As a result, a user may wish to delete all rows where a region field corresponds to "Region A."

Existing methods for deleting database records include the step of a database management system deleting a row. Next, the database management system logs details of the delete step to a delete log. This logging continues even for bulk operations where many rows are deleted by a common request. Consequently, a great number of delete logs can be created. Managing a great number of delete logs is burdensome because an undesirable amount of time is required to manage the delete logs and because an undesirable amount of storage space may be used to store the delete logs. Lengthy delete logs may also slow processes down when a user attempts to recover data previously deleted. A database management system operates slower when an unnecessarily large delete log is used to recover data previously deleted.

An example of an existing method for deleting database records and logging deletion of the records is as follows. A user commands a database management system to delete data. The user composes the command as a transaction that includes a delete request. The delete request includes a condition that permits the database management system to qualify a row based on whether the row has a column or field that stores a value that meets the condition. When a field in the row meets the condition, the row qualifies. Under conventional methods, selected fields of each row are tested. A database management system continues testing subsequent rows in this manner. For each qualifying test of each row, the database management system deletes a qualifying row and logs the change to a delete log.

SUMMARY OF THE INVENTION

The methods and devices described herein provide a computer implemented method and computer usable program code for deleting data. A multidimensional clustering processor receives a request to delete a set of multidimensionally clustered data. The multidimensional clustering processor determines whether all multidimensionally clustered data is located in a block. Responsive to all multidimensionally clustered data qualifying for deletion, the multidimensional clustering processor deletes all data in the block to delete the set of multidimensionally clustered data.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
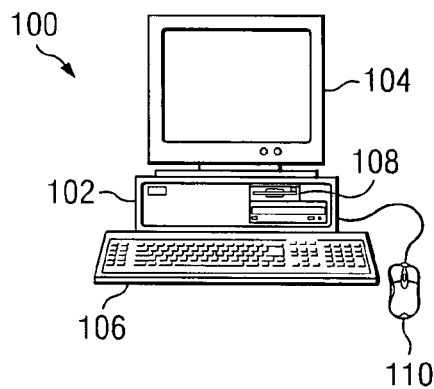
FIG. 1 is a data processing system in accordance with an illustrative embodiment.

With reference now to the figures and in particular with reference to FIG. 1, a pictorial representation of a data processing system in which illustrative embodiments may be implemented. Computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments may be implemented in other types of data processing systems, such as a network computer. Computer 100 also preferably includes a graphical user interface (GUI) that may be implemented by means of systems software residing in computer readable media in operation within computer 100.

Figure 2:
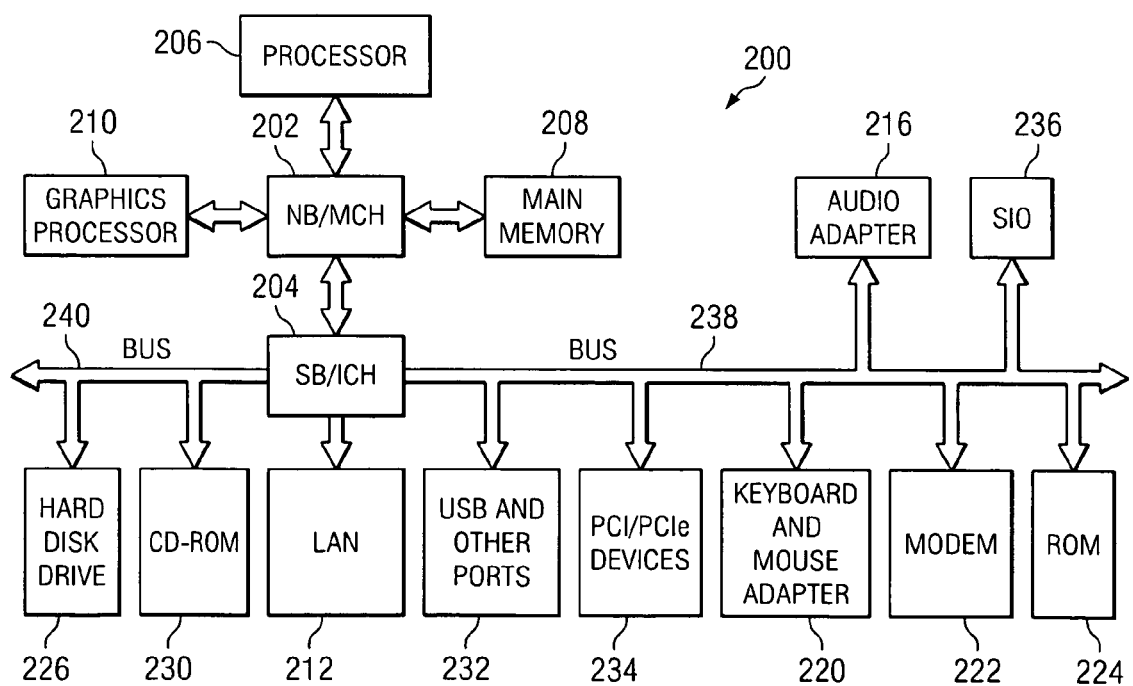
FIG. 2 is a block diagram of a data processing system in accordance with an illustrative embodiment.

FIG. 2 shows a block diagram of a data processing system in which embodiments may be implemented. Data processing system 200 is an example of a computer, such as computer 100 in FIG. 1, in which code or instructions implementing the illustrative embodiment processes may be located. In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 connected to north bridge and memory controller hub 202. Graphics processor 210 connects to the MCH through an accelerated graphics port (AGP), for example.

In the depicted example, local area network (LAN) adapter 212 connects to south bridge and I/O controller hub 204 and audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 connects to south bridge and I/O controller hub 204.

An operating system runs on processor 206, and coordinates and provides control of various components within data processing system 200 in FIG. 2. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java programs or applications executing on data processing system 200. Java is a trademark of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processor 206. The processes of the illustrative embodiments are performed by processor 206 using computer implemented instructions, which may be located in a memory such as, for example, main memory 208, read only memory 224, or in one or more peripheral devices.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide a computer implemented method, and computer usable program code for rapidly deleting database data. Deleting includes marking multiple rows as free. Slices and other groupings of database rows are unified into a common block of storage. The illustrative embodiments recognize when common elements of the rows qualify under a delete rule or condition. The illustrative embodiments delete the tract of rows by marking the block as deleted or otherwise rolled out, rather than delete rows piecemeal.

Figure 3:
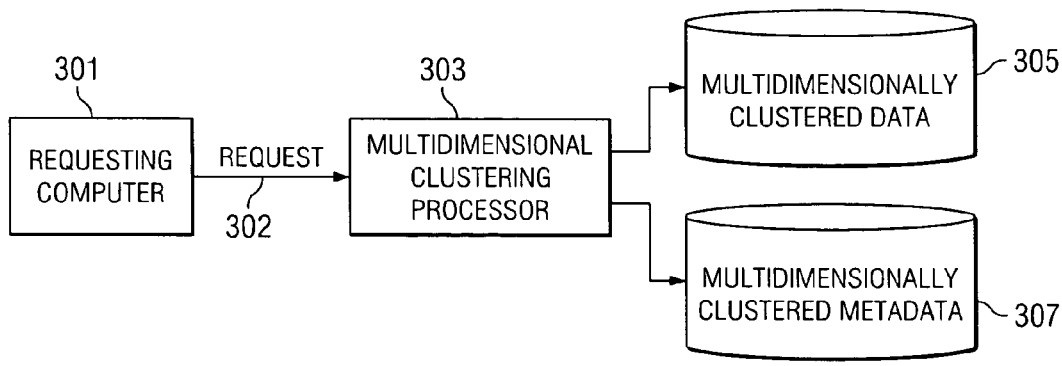
FIG. 3 shows a data flow diagram of a system of processors in accordance with an illustrative embodiment.

FIG. 3 shows a data flow diagram of a system of processors in accordance with an illustrative embodiment. Requesting computer 301 can be a client computer, for example, data processing system 200 of FIG. 2. A user often controls a database management system by sending a transaction to the database management system. The transaction includes one or more requests, for example, a delete request. A user dispatches request 302 to multidimensional clustering processor 303. A multidimensional clustering processor may be a database management system, for example, an instance of data processing system 200 of FIG. 2. Multidimensional clustering processor 303 may be a database management system operating on a second instance of a data processing system, for example, data processing system 200 of FIG. 2. A transaction is a set of requests provided sequentially to a multidimensional clustering processor. A transaction may include, for example, a delete request. Multidimensional clustering processor 303 may assign a transaction identifier to the request. A transaction identifier is a unique identifier associated with a specific transaction. The transaction identifier persists as an identifier for the duration that a multidimensional clustering processor executes steps responsive to the requests in the transaction. The transaction identifier permits tracking of activity from different entities and among separate transactions from the same computer.

Multidimensional clustering processor 303 makes changes to a database by inserting data, deleting data, updating data, and making other changes to multidimensionally clustered data 305 and associated multidimensionally clustered metadata 307. Multidimensionally clustered data 305 in a multidimensionally clustered database are arranged as rows and columns of values in one or more tables. A set of multidimensionally clustered data is two or more rows that each has the same value in at least one column or attribute of the respective row or record. A field is a specific instance of a value of a column in a row. A value is any bit-representation that may be stored in a field of a row or record. A row includes at least two values.

Multidimensional clustering metadata is a second set of data that describes or modifies a first set of data in a database.

Data in a database is the content of a row, sometimes called values. For example, a user can define a table within a multidimensionally clustered database. The user establishes a specific page size in bits or bytes. The user establishes a specific number of pages to be assigned a block for the table. As a table is created, expanded, and contracted, the multidimensional clustering processor tracks block identifiers, page identifiers, and other unit identifiers in order to organize allocations of memory, processor time, and storage in a balanced manner. Because a database management system uses the blocks, pages, and status bits to organize the tables of the database, the blocks, pages, and status bits can be characterized as metadata.

Figure 4:
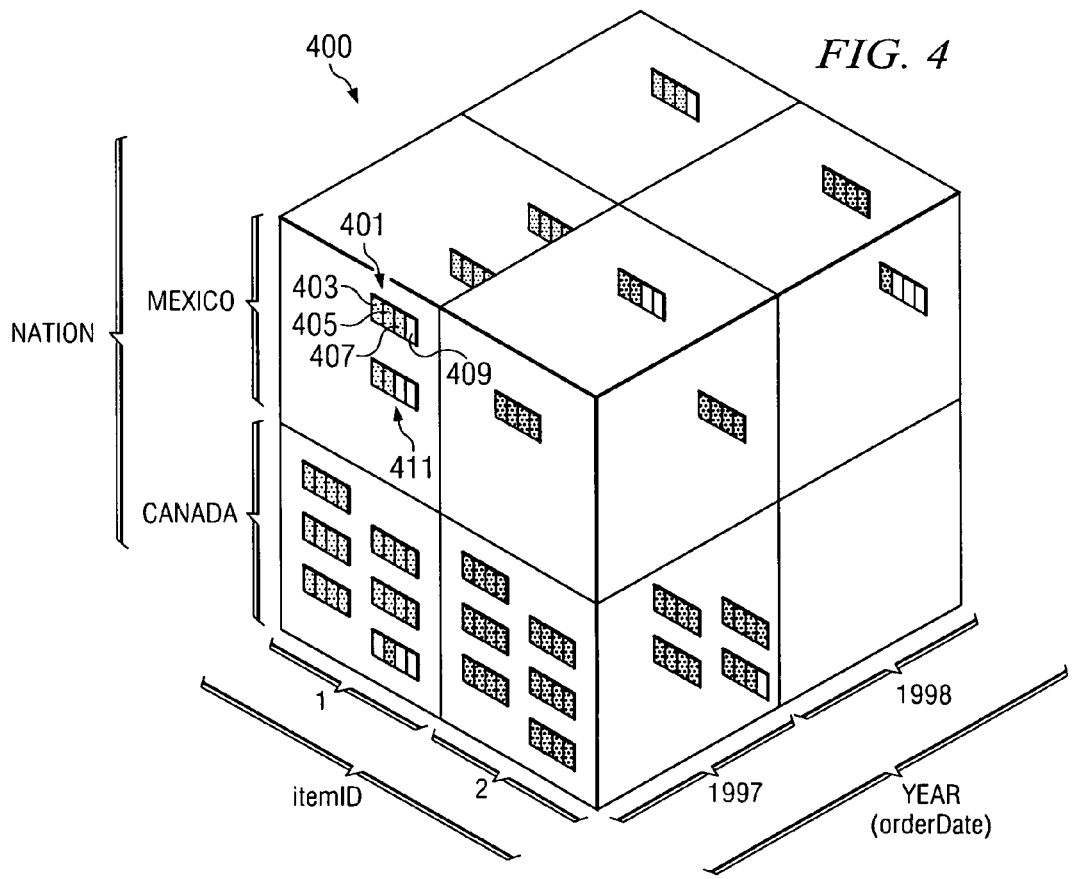
FIG. 4 shows a data structure of relations among structures in accordance with an illustrative embodiment.

FIG. 4 shows a data structure of relations among structures in accordance with an illustrative embodiment. The data structure shown in FIG. 4 can be implemented in a data processing system, such as data processing system 100 shown in FIG. 1 or data processing system 200 shown in FIG. 2. Additionally, the data structure shown in FIG. 4 can be used with respect to the data flow described in FIG. 3. Populated table 400 is a table having columns that include data related to "nation", "itemID", and "year".

Two blocks, block A 401 and block B 411 are shown that allocate space for rows that include multidimensionally clustered data. A block is a storage allocation, and includes metadata that defines various aspects of the storage allocation for purposes of maintaining database integrity. For example, a block may include bits that store values that indicate that a block is in use and should not be edited for a period of time. A storage allocation is an address in a finite amount of storage. The address is unique to the block. A block size is a number of bits established by the operating system. The storage allocation includes a whole number of blocks, each the size of a block size. The block size also can be expressed in terms of a whole number of pages. A page is a fixed number of bits.

Thus, a block map can include metadata such as a block header. The block header includes status bits for at least one page up to a limit set at the inception of a table. In addition, the block header can have a field for a transaction identifier. Beyond the block header, a block itself can be associated with one or more status bits. Status bits include, for example, "reserved", "in use", "free", and "roll out". Such status bits can be indicated by the presence of a bit set to a logical 1. A database can insert one or more rows into a common block, wherein all rows have a common value in the same field or fields. A page is a unit of contiguous storage. A page referenced in a block is physically adjacent to at least another page in the block. Status bits can be indicated by the presence of a bit set to a logical 0, according to user preferences. In the illustrative example shown in FIG. 4, Block A 401 includes four pages, page 1 403, page 2 405, page 3 407, and page 4 409.

A multidimensionally clustered database organizes multidimensionally clustered data in several ways. Block A 401 contains multidimensionally clustered data. A multidimensionally clustered database allocates space in a common block to two or more rows. Further, the multidimensional clustering database assures that any remaining rows, also allocated to the block, have the same value in the same at least one column or attribute. Consequently, all data in the block is multidimensionally clustered data.

Figure 5A:
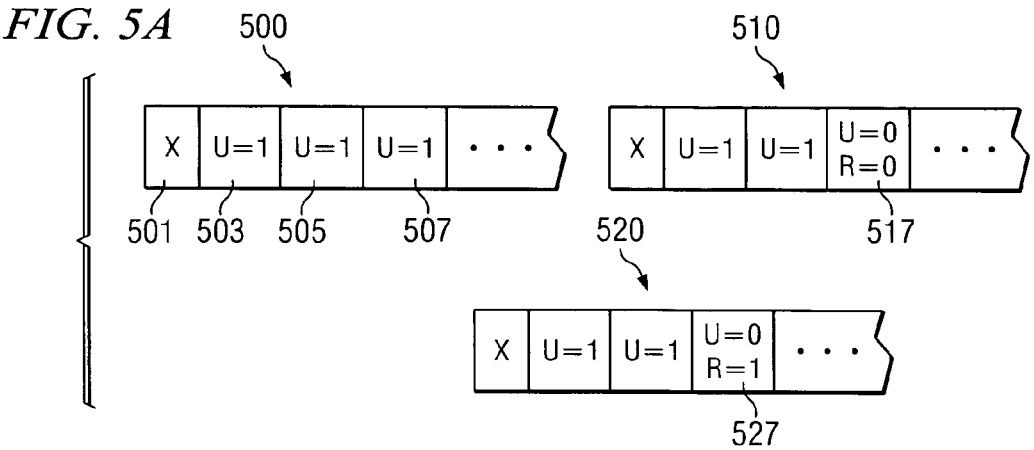
FIG. 5A shows a sequence of revisions to a block status data structure accordance with an illustrative embodiment.

FIG. 5A shows a sequence of revisions to a block map or block status data structure in accordance with an illustrative embodiment. The block map may be stored in the first page of a block, for example, page 1 403 of block A 401 in FIG. 4. The block map includes status bits associated with a block. A status bit is, for example, a roll-out bit. The roll-out bit, if set, indicates that the block and associated pages and records are deleted, but yet may be recoverable. Status bits may be grouped to form a status field. Thus, a status field is an extension of a status bit.

An in-use status bit establishes that a block is either usable or unusable. For example, a user can choose that a '1' bit indicates that a block is in-use, and thus unusable for purposes of storing new data. Similarly, a user may choose that a '0' bit indicates that a block is not currently in-use, and thus usable for purposes of storing new data.

In response to receiving a request, a multidimensional clustering processor, for example, clustering processor 301 of FIG. 3, searches among blocks and changes a block map. In the first time, FIG. 5A shows the change as the first time block map 500. The status bits of blocks held therein are as follows: Block 1 501 is reserved. Block 2 503 is in-use. Block 3 505 is in-use. Block 4 507 is in-use. At a second time, the multidimensional clustering processor may change the block map to second time block map 510. The multidimensional clustering processor can select block 4 517 and reset the in-use bit to a usable status. In this case, the multidimensional clustering processor leaves a roll-out bit unchanged. At a third time, the multidimensional clustering processor changes the roll-out bit in third time block map 520 to 1. In this example block 4 527 is "rolled out".

Figure 5B:
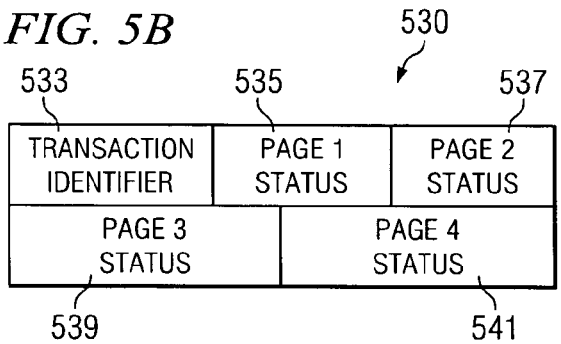
FIG. 5B shows a page status data structure in accordance with an illustrative embodiment.

FIG. 5B shows a page status data structure in accordance with an illustrative embodiment. A single page status data structure is associated with each block. A number of page statuses bits exist that correspond to the ratio of pages per block established at table inception time. Page status data structure 530, in this example, allocates space to store transaction identifier 533, page 1 status 535, page 2 status 537, page 3 status 539, and page 4 status 541. Fewer or more page statuses can be present, depending on the number of pages established for each block.

Figure 6:
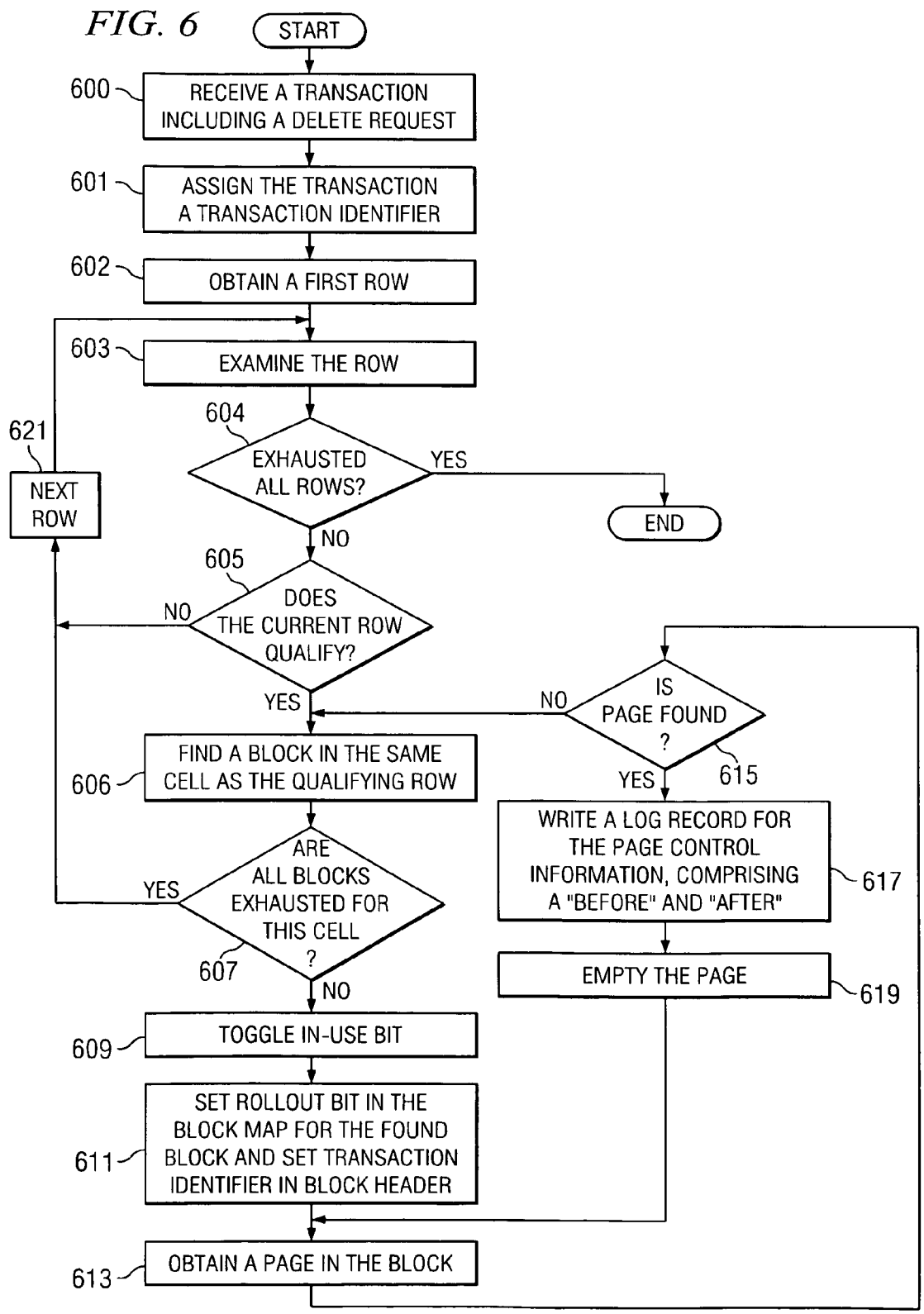
FIG. 6 is a flowchart showing deletion of database records in accordance with an illustrative embodiment.

FIG. 6 is a flowchart showing deletion of database records in accordance with an illustrative embodiment. A multidimensional clustering processor, for example, multidimensional clustering processor 303 of FIG. 3, can carry out the steps of FIG. 6. Initially, a multidimensional clustering processor receives a transaction including a delete request (step 600). The delete request specifies a condition. A condition is a value related by a relation. The relation can be implicit in the way that a database software interprets the value. For example, database software can interpret that a condition that includes only a value means that the condition is true for each field that matches the value. A relation can include a mathematical relation or a collating sequence relation.

Next, the multidimensional clustering processor assigns the transaction a transaction identifier (step 601). The multidimensional clustering processor obtains a first row (step 602). The multidimensional clustering processor examines the row of the database (step 603). The multidimensional clustering processor determines if all rows are exhausted (step 604). All rows become exhausted when either the multidimensional clustering processor examines each row, or the multidimensional clustering processor finds a block that contains each row. If all rows are exhausted, then processing terminates. However, if not all rows are exhausted, then the multidimensional clustering processor determines whether all multidimensionally clustered data in the block qualifies for deletion.

The multidimensional clustering processor begins this determination by determining whether the current row qualifies (step 605). Qualifying is an action that a multidimensional clustering processor takes to determine that a field in a row meets a condition. For example, a multidimensional clustering processor may qualify a row by determining that the field for "nation" matches a value "Mexico". A qualification, or the status of a row being qualified, can extend, based on association, from a row to the block in which the row is stored. Under such a circumstance, if the row qualifies, then the associated block is qualified.

If the row qualifies, the multidimensional clustering processor finds a block in the same slice as the qualifying row (step 606). For example, the multidimensional clustering processor may find block A 401 of FIG. 4. A dimension or slice, occurs when a value or key value is identical in multiple rows along a particular column in a table. A slice is all rows having the identical value. A more limited form of a slice is a cell. A cell is a grouping of rows that satisfy multiple dimension conditions. Thus, a cell is at least two columns shared by the rows. Accordingly, a cell has a first value and a second value.

The multidimensional clustering processor determines whether all blocks are exhausted for this cell (step 607). Blocks become exhausted when the multidimensional clustering processor completes a search for blocks by testing each block, as accomplished, for example, during repeated executions of step 606. When a multidimensional clustering processor finds the block, the multidimensional clustering processor has finished determining whether all multidimensionally clustered data in the block qualifies for deletion. A negative exit to step 607 causes the multidimensional clustering processor to toggle an in-use bit associated with the block (step 609). For example, the multidimensional clustering processor sets the in-use bit to '1'. As explained above, if the in-use bit is set to '1', then the block is "in use" and not usable for storage of new data.

Next, the multidimensional clustering processor sets a roll-out bit in the block map for the found block and sets the transaction identifier in the block header (step 611). The multidimensional clustering processor obtains a page in the block (step 613). The multidimensional clustering processor obtains, for example, page 1 403 of FIG. 4. The multidimensional clustering processor determines whether the page is found (step 615). If the page is found, the multidimensional clustering processor writes a log record for the page control information. The log record includes a description of page control information both before and after the deletion. The log record therefore can be characterized to include a "before description" and an "after description" (step 617).

Next, the multidimensional clustering processor empties the page (step 619). The multidimensional clustering processor continues obtaining more pages in the block by re-executing step 613. Eventually, the multidimensional clustering processor determines that a new page is not found (step 615). In this example, the multidimensional clustering processor determines that all pages have been processed according to steps 617 and 619. In this case, the multidimensional clustering processor continues to find more blocks by re-executing step 606.

Returning to step 607, once all blocks are exhausted for a particular cell, the multidimensional clustering processor seeks out the next row (step 621). In addition, the multidimensional clustering processor continues to seek out the next row at step 621 when the processor is looking among rows within the flow chart loop governed by step 605. Eventually the multidimensional clustering processor exhausts all rows in the final block. The process terminates thereafter.

Figure 7:
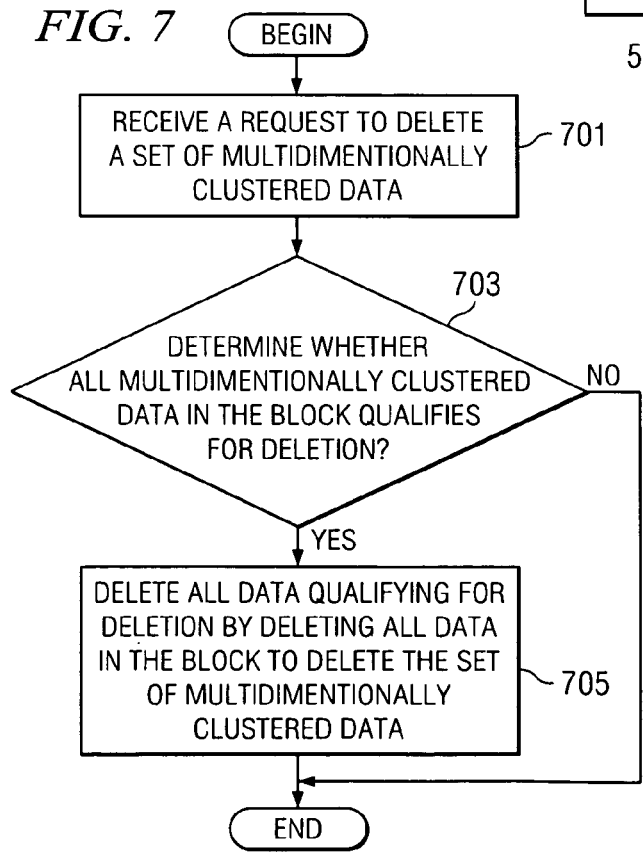
FIG. 7 is a flowchart showing deletion of database records in accordance with an alternative illustrative embodiment.

FIG. 7 is a flowchart showing deletion of database records in accordance with an alternative illustrative embodiment. A multidimensional clustering processor, for example, multidimensional clustering processor 303 of FIG. 3, may carry out the steps of FIG. 7.

Initially, a multidimensional clustering processor receives a request to delete a set of multidimensionally clustered data (step 701). Next, the multidimensional clustering processor determines whether all multidimensionally clustered data in the block qualifies for deletion (step 703). Following an affirmative determination, the multidimensional clustering processor deletes all data qualifying for deletion. The multidimensional clustering processor deletes qualifying data by deleting all data in the block. Thus, the multidimensional clustering processor deletes the set of multidimensionally clustered data (step 705). Processing terminates thereafter.

Figure 8:
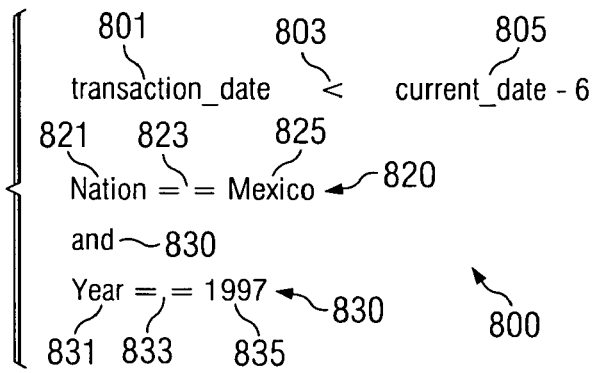
FIG. 8 shows a set of examples of conditions used to qualify a row or a block in accordance with an illustrative embodiment.

FIG. 8 shows a set of examples of conditions used to qualify a row or a block in accordance with an illustrative embodiment. Term "transaction date" 801 describes a field in rows of a table. Term 803 "less than" describes a mathematical relation. The term "less than" may couple a value with a field to be considered for testing. Term 805 "current date" is a variable that stores the current date existing when the multidimensional clustering processor operates the function. Term 800 "condition" expresses a true value for all rows where the transaction date is less than six months prior to the current date. In term 820 "condition", term 821 "nation" describes a field in rows of a table. Term 823 "equivalency" describes a relation that the data is the same. Term 825 "Mexico" describes a data string tested by term 823 "equivalency". Thus, term 820 "condition" tests true for a row if the nation field is set to Mexico. In term 830 "condition," term 831 "year" describes a field in rows of a table. Term 833 "equivalency" describes a relation that the data is the same. Term 835 "1997" describes a year against which the row's field can be compared. Thus, term 830 "condition" tests true for a row if the year field is set to 1997.

The above-described fields are only examples of fields. Many other fields and field types can be subjected to meeting a condition. For example, a field can be related to a value based on the field containing an integer, a floating-point value, or a string. In addition, a condition can be expressed as combinations linked with Boolean operators, for example, 'AND' and 'OR'. A condition also can be described as follow: "where year<2000 and country=Mexico."

Figure 9:
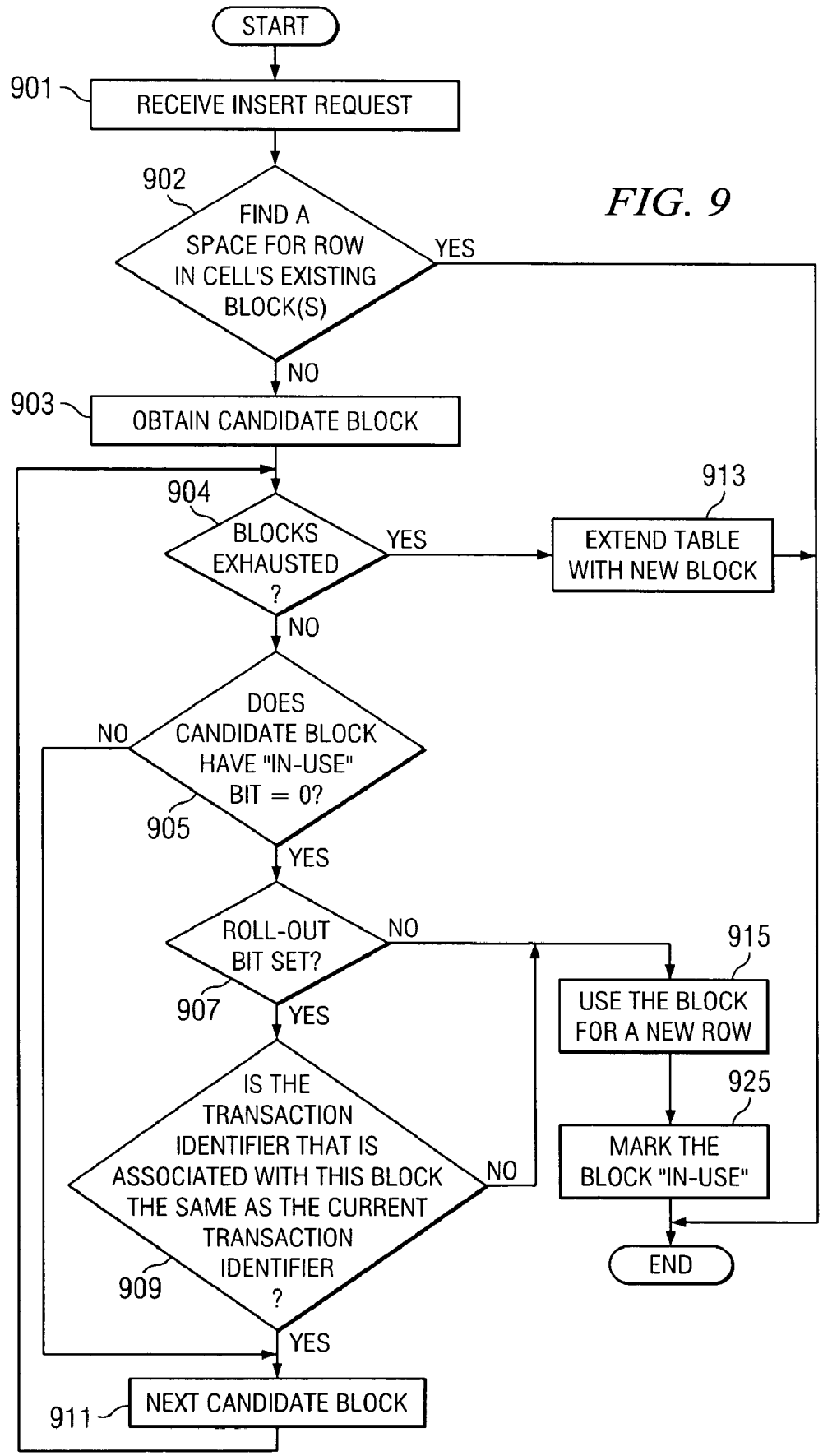
FIG. 9 is a flowchart showing insertion of data in accordance with an illustrative embodiment.

FIG. 9 is a flowchart showing insertion of data in accordance with an illustrative embodiment. The multidimensional clustering processor receives an insert request (step 901). The multidimensional clustering processor determines whether the clustering processor can find a space for a row in a cell's existing block (step 902). A negative determination causes the multidimensional clustering processor to enter a loop that looks among candidate blocks for a suitable block. A candidate block is block that does not have space for a row insert.

The multidimensional clustering processor obtains a first candidate block (step 903). The multidimensional clustering processor determines whether a set of candidate blocks are exhausted (step 904). The multidimensional clustering processor determines whether a candidate block can be used (step 905). The multidimensional clustering processor makes this determination by determining if the "in-use" bit is set to zero. If the outcome of step 905 is positive, the multidimensional clustering processor determines whether the candidate block is not in conflict.

A candidate block is not in conflict if the roll-out bit is set to zero for the candidate block. In addition, a candidate block is not in conflict if the candidate block's transaction identifier differs from the transaction identifier of the current transaction. In contrast, a candidate block is conflicted if both the roll-out bit is set to 1 for the candidate block and a transaction identifier associated with the candidate block is the same as the current transaction identifier assigned to the transaction. In steps 907 or 909 the multidimensional clustering processor makes this determination. For example, the multidimensional clustering processor determines if the roll-out bit is set (step 907). A negative determination indicates that the candidate block is not in conflict, and processing continues at step 915.

A positive determination, however, causes the multidimensional clustering processor to determine whether the transaction identifier associated with the candidate block is the same as the current transaction identifier (step 909). A negative determination indicates that the candidate block is not in conflict, and processing continues at step 915. The multidimensional clustering processor uses the candidate block for a new row (step 915). The multidimensional clustering processor marks the candidate block as in use (step 925). Processing terminates thereafter.

If the candidate block is conflicted, that is, if both steps 907 and 909 are positive, then the multidimensional clustering processor obtains the next candidate block (step 911). Step 911 is executed in case a candidate block has an in-use bit set to 1, as determined at step 905. If all candidate blocks are exhausted at step 904, the multidimensional clustering processor extends the table with a new block.

The multidimensional clustering processor determines whether a candidate block can be used (step 905). The multidimensional clustering processor makes this determination by determining if the "in-use" bit is set to zero. If the outcome of step 905 is positive, the multidimensional clustering processor determines whether the candidate block is not in conflict. A candidate block is not in conflict if either the roll-out bit is set to zero for the candidate block, or if the transaction identifier, if any, associated with the candidate block is different than the current transaction identifier.

In steps 907 or 909, the multidimensional clustering processor makes this determination. For example, the multidimensional clustering processor determines if the roll-out bit is set (step 907). A negative determination indicates that the candidate block is not in conflict, and processing continues at step 915. A positive determination, however, causes the multidimensional clustering processor to determine whether the transaction identifier that is associated with the candidate block is the same as the current transaction identifier (step 909).

If the candidate block is conflicted the multidimensional clustering processor obtains the next candidate block (step 911). Step 911 is executed in case a candidate block has an "in-use" bit set to 1, determined at step 905. If the multidimensional clustering processor determines that all candidate blocks are exhausted at step 904, the multidimensional clustering processor extends the table with a new block (step 913).

Figure 10:
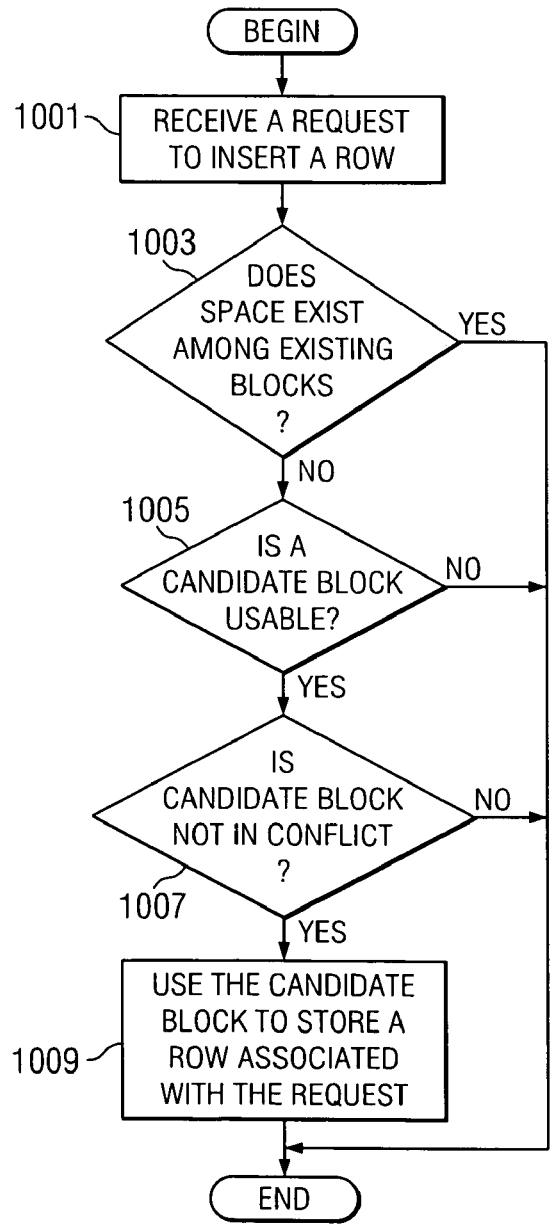
FIG. 10 is a flowchart showing insertion of data in accordance with an illustrative embodiment.

FIG. 10 is a flowchart showing insertion of data into a table in accordance with an alternative illustrative embodiment. The multidimensional clustering processor receives a request to insert a row (step 1001). The multidimensional clustering processor determines whether space exists among existing blocks (step 1003). A negative determination causes the multidimensional clustering processor to determine whether a candidate block is usable (step 1005). A negative determination causes the process to terminate. However, a positive determination causes multidimensional clustering processor to determine whether the candidate block is not in conflict (step 1007). If the candidate block is not in conflict, the multidimensional clustering processor uses the candidate block to store a row associated with the request (step 1009).

The process terminates thereafter. Similarly, if the determination in step 1007 is negative, the process terminates.

Thus, the illustrative embodiments provide a computer implemented method and computer usable program code for block deleting a block of rows, when the rows are multidimensionally clustered data that all qualify a condition. Additionally, some illustrative embodiments log each block written as a way to provide a way for later processing to rollback any deletion.

The methods and devices described herein have several advantages. Logging of a delete merely requires logging the fact that a multidimensional clustering processor deleted a block or page. In addition, the resultant log is more compact than a conventional log.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for deleting data, the computer implemented method comprising:

receiving a transaction, wherein the transaction comprises a delete request, including a condition, to delete a set of multidimensionally clustered data;

responsive to receiving the transaction, obtaining a row on a multidimensional clustering database located on a multidimensional clustering processor;

determining whether all rows are exhausted;

responsive to a determination that all rows are not exhausted, determining whether a field in the obtained row meets the condition;

responsive to a determination that the field in the obtained row meets the condition, forming a qualified row;

locating a block in a same cell as the qualified row;

determining whether all blocks in the cell are exhausted;

responsive to a determination that all blocks in the cell are not exhausted, marking the located block by setting an in-use bit, and setting a rollout bit to form a set of marked blocks, wherein the set of marked blocks is unusable for storing new data;

determining whether each page in the located block is obtained;

responsive to each page being obtained in the located block, writing a log record for each page, wherein the log record comprises a description of page control information for both before and after a deletion of the set of multidimensionally clustered data;

emptying each page in the located block, deleting all data in the located block to delete the set of multidimensionally clustered data; and responsive to a determination that all blocks in the cell are exhausted, obtaining a next row to determine a next block.

2. The computer implemented method of claim 1, wherein obtaining the next row further comprises:

finding a second block;

determining whether the second block contains the set of multidimensionally clustered data that qualifies for deletion; and responsive to the second block containing the set of multidimensionally clustered data, deleting all data in the second block to delete the set of multidimensionally clustered data.

3. The computer implemented method of claim 1, wherein the cell is a grouping of rows that satisfy multiple dimension columns.

4. The computer implemented method of claim 1, further comprising:

assigning the transaction a transaction identifier, wherein the transaction identifier is a unique identifier, wherein the transaction identifier persists as an identifier for a duration that the multidimensional clustering processor executes steps responsive to a set of requests in the transaction.

5. The computer implemented method of claim 1, wherein a block comprises a specific number of pages.

6. The computer implemented method of claim 1, wherein each page is physically adjacent to at least another page in the located block.

7. A computer program product comprising a computer readable storage medium storing computer usable program code, wherein the computer program product comprises:

computer usable program code for receiving a transaction, wherein the transaction comprises a delete request, including a condition, to delete a set of multidimensionally clustered data;

computer program code for responsive to receiving the transaction, obtaining a row on a multidimensional clustering database located on a multidimensional clustering processor;

computer program code for determining whether all rows are exhausted;

computer program code for responsive to a determination that all rows are not exhausted, determining whether a field in the obtained row meets the condition;

computer program code for responsive to a determination that the field in the obtained row meets the condition, forming a qualified row;

computer program code for locating a block in a same cell as the qualified row;

computer program code for determining whether all blocks in the cell are exhausted;

computer program code for responsive to a determination that all blocks in the cell are not exhausted, marking the block by setting an in-use bit, and setting a rollout bit to form a set of marked blocks, wherein the set of marked blocks is unusable for storing new data;

computer program code for determining whether each page in the located block is obtained;

computer program code for responsive to each page in the located block being obtained, writing a log record for each page, wherein the log record comprises a description of page control information for both before and after a deletion of the set of multidimensionally clustered data;

computer program code for emptying each page in the located block, deleting all data in the located block to delete the set of multidimensionally clustered data; and computer program code for responsive to a determination that all blocks in the cell are exhausted, obtaining a next row to determine a next block.

8. The computer program product of claim 7, wherein obtaining the next row further comprises:

computer usable program code for finding a second block;

computer usable program code for determining whether the second block contains the set of multidimensionally clustered data that qualifies for deletion; and computer usable program code for responsive to the second block containing the set of multidimensionally clustered data, deleting all data in the second block to delete the set of multidimensionally clustered data.

9. The computer program product of claim 7, wherein the cell is a grouping of rows that satisfy multiple dimension columns.

10. The computer program product of claim 7, further comprising:

computer usable program code for assigning the transaction a transaction identifier, wherein the transaction identifier is a unique identifier, wherein the transaction identifier persists as an identifier for a duration that the multidimensional clustering processor executes steps responsive to a set of requests in the transaction.

11. The computer program product of claim 7, wherein a block comprises a specific number of pages.

12. The computer program product of claim 7, wherein each page is physically adjacent to at least another page in the block.

13. A data processing system for deleing data, wherein the data processing system comprises:

a bus;

a memory connected to the bus, wherein the memory stores a set of instructions;

a processing unit connected to the bus, wherein the processing unit executes the set of instructions to receive a transaction, wherein the transaction comprises a delete request, including a condition, to delete a set of multi-dimensionally clustered data; to obtain a row on a multidimensional clustering database located on a multidimensional clustering processor, responsive to receiving the transaction; to determine whether all rows are exhausted; to determine whether a field in the obtained row meets the condition, responsive to a determination that all rows are not exhausted; to form a qualified row responsive to a determination that the field in the obtained row meets the condition; to locate a block in a same cell as the qualified row; to determine whether all blocks in the cell are exhausted; to mark the located block by setting an in-use bit, and setting a rollout bit to form a set of marked blocks, wherein the set of marked blocks is unusable for storing new data, responsive to a determination that all blocks in the cell are not exhausted; to determine whether each page in the block is obtained; to write a log record for each page, wherein the log record comprises a description of page control information for both before and after a deletion of the set of multidimensionally clustered data responsive to each page being obtained; to empty each page in the located block, deleting all data in the located block to delete the set of multidimensionally clustered data; and to obtain a next row to determine a next block, responsive to a determination that all blocks in the cell are exhausted.

* * * * *